(12) United States Patent
Subramanian

(10) Patent No.: US 10,523,609 B1
(45) Date of Patent: Dec. 31, 2019

(54) MULTI-VECTOR MALWARE DETECTION AND ANALYSIS

(71) Applicant: FIREEYE, INC., Milpitas, CA (US)

(72) Inventor: Sakthi Subramanian, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 14 days.

(21) Appl. No.: 15/390,947

(22) Filed: Dec. 27, 2016

(51) Int. Cl.
G06F 11/00 (2006.01)
H04L 12/58 (2006.01)
H04L 29/06 (2006.01)
G06Q 10/10 (2012.01)

(52) U.S. Cl.
CPC .......... *H04L 51/12* (2013.01); *G06Q 10/107* (2013.01); *H04L 12/585* (2013.01); *H04L 51/08* (2013.01); *H04L 63/145* (2013.01); *H04L 63/1416* (2013.01)

(58) Field of Classification Search
CPC ............................. H04L 63/1491; G06F 21/56
USPC ........................................................ 726/24
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |
| 5,878,560 A | 3/1999 | Johnson | |
| 5,960,170 A | 9/1999 | Chen et al. | |
| 5,978,917 A | 11/1999 | Chi | |
| 5,983,348 A | 11/1999 | Ji | |
| 6,013,455 A | 1/2000 | Bandman et al. | |
| 6,088,803 A | 7/2000 | Tso et al. | |
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |

(Continued)

FOREIGN PATENT DOCUMENTS

GB 2439806 A 1/2008
GB 2490431 A 10/2012

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub_--mining.pdf-.

(Continued)

*Primary Examiner* — Samson B Lemma
(74) *Attorney, Agent, or Firm* — Rutan & Tucker, LLP

(57) ABSTRACT

A computerized method to coordinate the detection capabilities of an email-based malware detection system with the detection capabilities of a network-based malware detection system and prevent multi-vector cyber-security attacks. The described system detects and analyzes suspicious objects via the email vector and monitors and analyzes associated objects via the network vector, collecting features of each object. The features of associated objects are analyzed, correlated and classified to determine if they are malicious.

21 Claims, 3 Drawing Sheets

(56) References Cited

U.S. PATENT DOCUMENTS

| | | |
|---|---|---|
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,251,215 B1 | 7/2007 | Turner et al. |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,516,488 B1 | 4/2009 | Kienzle et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B2 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |

(56) References Cited

U.S. PATENT DOCUMENTS

| | | |
|---|---|---|
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |

(56) References Cited

U.S. PATENT DOCUMENTS

| | | |
|---|---|---|
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0032717 A1 * | 3/2002 | Malan .................... H04L 41/12 718/105 |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gable et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |

(56) References Cited

U.S. PATENT DOCUMENTS

| | | |
|---|---|---|
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222728 A1 | 9/2008 | Chavez et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0100718 A1 | 4/2010 | Srinivasan |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0179487 A1* | 7/2011 | Lee ............ H04L 51/12 726/23 |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |

(56) References Cited

U.S. PATENT DOCUMENTS

| | | |
|---|---|---|
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0123279 A1* | 5/2014 | Bishop ................ H04L 63/1491 726/23 |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shifter et al. |
| 2014/0189882 A1 | 7/2014 | Jung et al. |
| 2014/0237600 A1 | 8/2014 | Silberman et al. |
| 2014/0254379 A1* | 9/2014 | Sampath ............... H04N 21/643 370/235 |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0269422 A1* | 9/2016 | McDougal ............ H04L 63/145 |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| JP | 2003-256469 A | 9/2003 |
| JP | 2004-240945 A | 8/2004 |
| JP | 2005-056048 A | 3/2005 |
| WO | 02/06928 A2 | 1/2002 |
| WO | 02/23805 A2 | 3/2002 |
| WO | 2007/022454 A2 | 2/2007 |
| WO | 2007-117636 A2 | 10/2007 |
| WO | 2008/041950 A2 | 4/2008 |
| WO | 2008/084259 A1 | 7/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Anonymous, "Inside Adobe Reader Protected Mode—Part 1—Design", Oct. 5, 2010, XP055116424, Retrieved from Internet: URL:http://blogs.adobe.com/security/2010/10/inside-adobe-reader-protected--mode-part-1-design.html [retrieved on May 6, 2014].

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

(56) References Cited

OTHER PUBLICATIONS

Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField= Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., "'Analyzing and exploiting network behaviors of malware.'", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.-N-Version Antivirus in the Network Cloud, 17th USENIX Security Symposium USENIX Security '08 Jul. 28-Aug. 1, 2008 San Jose, CA.
Rautiainen et al., "A look at Portable Document Format Vulnerabilities", Information Security Technical Report, Elsevier Advanced Technology, Amsterdam, NL, vol. 14, No. 1, Feb. 1, 2009, pp. 30-33, XP026144094, ISSN: 1363-4127, DOI: 10.1016/J.ISTR. 2009.04.001.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.

(56) References Cited

OTHER PUBLICATIONS

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 13/089,191, filed Apr. 18, 2011 Non-Final Office Action dated Feb. 13, 2013.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Hiroshi Shinotsuka, Malware Authors Using New Techniques to Evade Automated Threat Analysis Systems, Oct. 26, 2012, http://www.symantec.com/connect/blogs/, pp. 1-4.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Lastline Labs, The Threat of Evasive Malware, Feb. 25, 2013, Lastline Labs, pp. 1-8.

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

\* cited by examiner

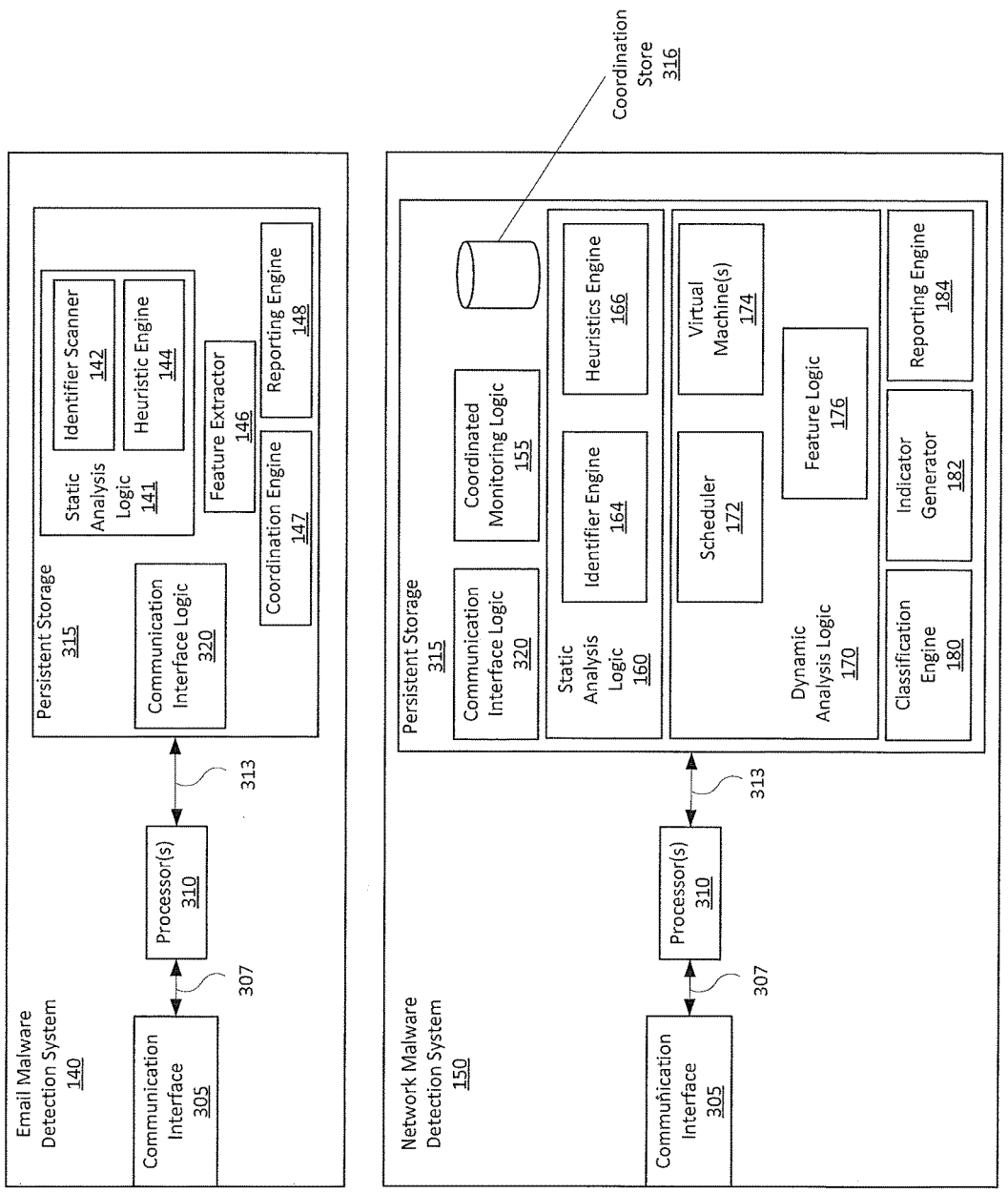

MULTI-VECTOR MALWARE DETECTION AND ANALYSIS

FIELD OF THE INVENTION

The present invention relates generally to cyber-security and more particularly to enhancing the detection of malware by enhancing the analysis of objects of attacks carried out using multiple vectors.

BACKGROUND OF THE INVENTION

Presently, malware (malicious software) can attack various devices of cyber infrastructure via a communication network. Malware may include any program or file that is harmful to a computer or its user, or otherwise operates without permission, such as bots, computer viruses, worms, Trojan horses, adware, spyware, or any programming that gathers information about a computer user.

Malware may be distributed via a first attack vector, by electronic messages, including email, using such protocols as POP, SMTP, IMAP, and various forms of web-based email. Malicious content may be directly attached to the message (for example as a document capable of exploiting a document reading application, such as a malicious Microsoft Excel document). Additionally, email may contain URLs (Uniform Resource Locators) to malicious content hosted on web servers elsewhere on the network (i.e., via the internet). When email recipients activate such links, they may become infected via a second vector, i.e., web-based attacks. In this way, the attack is multi-phased, with an initial email phase or stage that may appear benign and a second web download phase delivering a malicious package. These techniques for infecting recipient computers initiated via email are often used to make targeted attacks on particular "high-value" users at organizations, such as executives or key technical or operational staff.

Malware may also be distributed over a network via web sites, e.g., servers operating on a network according to an HTTP standard in response to a user navigating to a URL. Malicious network content distributed in this manner may be actively downloaded and/or installed on a user's computer, without the approval or knowledge of the user, simply by accessing the web site hosting the malicious network content. The web site hosting the malicious network content may be referred to as a malicious web site. The malicious network content may be embedded within data associated with web pages hosted by the malicious web site.

An improved system for detecting malware propagated via vectors, such as email and network content, is needed.

BRIEF DESCRIPTION OF THE DRAWINGS

Embodiments of this disclosure are illustrated by way of example and not by way of limitation in the figures of the accompanying drawings, in which like references indicate similar elements and in which:

FIG. 3A is an exemplary embodiment of a logical representation of the email malware detection system 140 of FIG. 1.

FIG. 3B is an exemplary embodiment of a logical representation of the network malware detection system 150 of FIG. 1.

DETAILED DESCRIPTION

Figure 1:
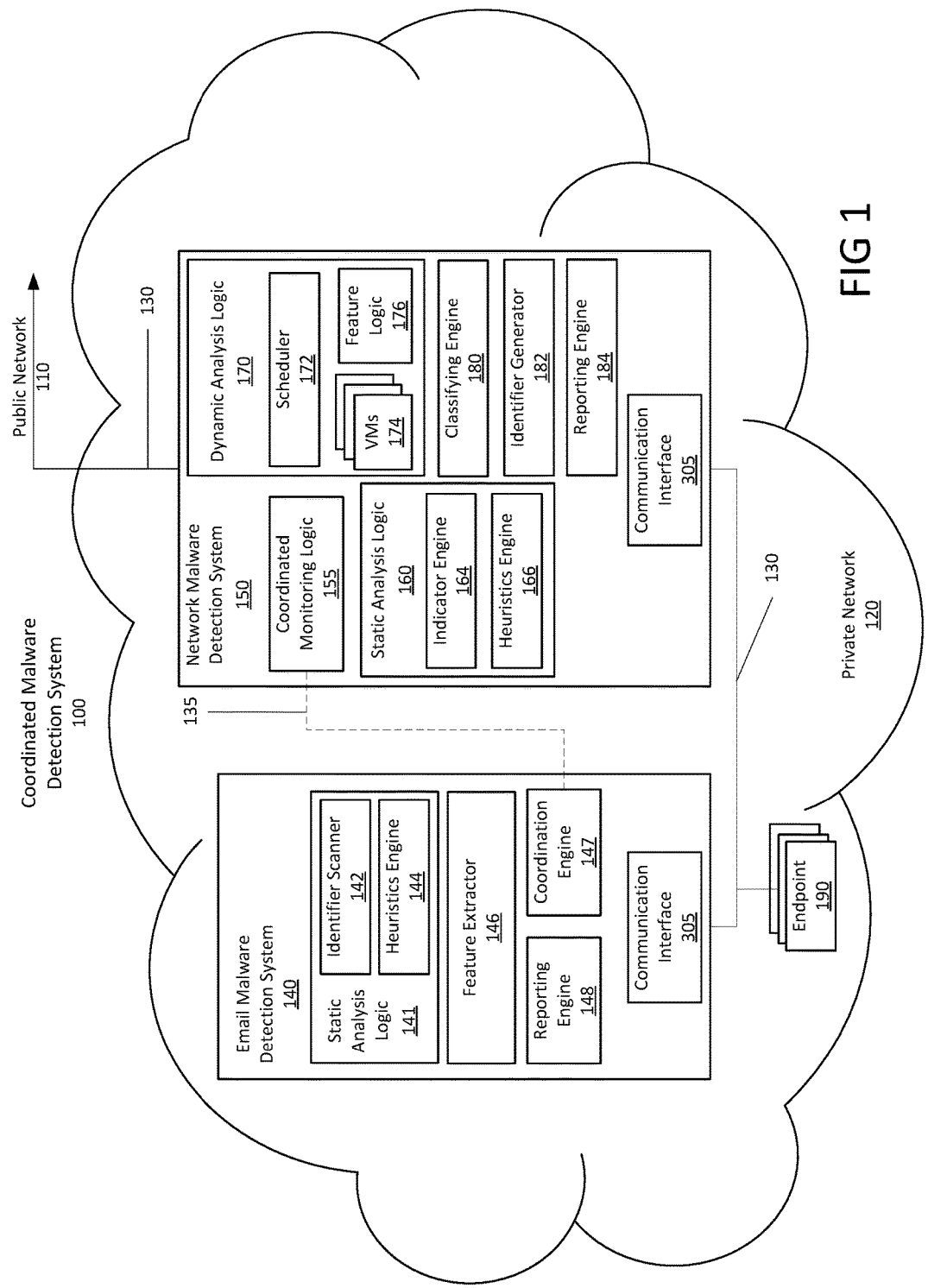
FIG. 1 is an exemplary block diagram of a coordinated malware detection system, in accordance with one or more embodiments described herein.

A cross-vector malware detection technique is provided to enhance the detection of a cyber-attack initiated by an electronic message (e.g., email) and furthered by a separate web download. The enhanced detection technique is configured to (i) receive an email directed to a designated recipient of an enterprise network, (ii) analyze the email to determine if the email contains suspicious objects and characteristics, (iii) associate each suspicious object with contextual information, including but not limited to the characteristics of the object and meta-information, about the email and store a flag indicating the email is suspicious, (iv) generate a suspicious object identifier for each identified suspicious object and provide to a network traffic monitoring device (v) deliver the email to the designated recipient, (vi) determine by a network traffic monitoring device at the network periphery, if network traffic is associated with the suspicious object; (vii) couple analysis of the suspicious network traffic with additional context information from the suspicious email, (viii) if the analysis determines the network traffic and email are malicious, update the stored flag for the email and issue an alert to a network administrator to indicate the email is malicious.

More specifically, electronic messages may be received by an email-based malware detection system (EMDS) for processing to determine if the email (or its attachment(s)) contains one or more objects that have a likelihood above a threshold of being malicious or at least suspicious. An object may constitute a sub-object contained within another object and separately analyzable for maliciousness. In this regard, an object may comprise, at least in part, an email message, an attachment thereto, and/or a component of another object. The EMDS may be configured to analyze the email, as an object potentially carrying malicious content, and process the object with a static analysis module and/or a dynamic analysis module which are adapted to detect and monitor features of the object. The features may include the statically detected characteristics and/or dynamically observed behaviors of the email identified during processing. For example, the email or its attachments may contain one or more URLs, each of which is treated as a feature of the email. The EMDS may extract the URLs from the analyzed email. The URLs may then be analyzed separately, as objects, by the static and/or dynamic analysis modules of the EMDS, or provided for remote analysis, to determine if they are malicious. If the EMDS determine the email is malicious or suspicious, the EMDS may store the features associated with the analyzed malicious or suspicious email to be retrieved later, and may modify the features (e.g., the URLs) embedded in the email (or its attachments) so as to include an identifier of maliciousness or suspiciousness and in so doing, prevent or block access from a designated recipient or recipient's computer to potentially malicious content. The identifier may be a static string embedded into the object, while in other embodiments may comprise a dynamic command (e.g. redirection) to be processed with the object. If the EMDS determines the email is benign, no further action is required. In some embodiments, if the EMDS identifies an email as malicious, the email is not delivered to the designated recipient of the email though an on-screen notice or warning identifying the email may be provided to the recipient, and if merely suspicious the email may be delivered to the designated recipient of the email, for example, with an on-screen notice or warning of its status.

In embodiments, where the discovered email features include one or more URLs embedded in the email (or its attachments), the EMDS may notify a network malware detection system (NMDS), on or protecting the enterprise network, to monitor network traffic between the enterprise network and websites corresponding to the URLs. The EMDS may communicate with the NMDS to provide the URLs (or other identifiers associated with suspicious objects) and contextual information to prompt the NMDS to monitor for one or more related communication sessions associated with the object of the suspicious email and conduct a malware analysis of the communications exchanged during the communication sessions.

The EMDS provides the NMDS with a suspicious object identifier, the identifier associated with a suspicious object as detected by the EMDS. The EMDS may provide the suspicious object identifier to the NMDS directly by sending a communication to the NMDS via a network link. The NMDS seek to detect any inbound traffic containing the identifier and will schedule any object contained in the detected inbound traffic for analysis. Inbound communications are network communications directed from entities (e.g. a web server or computing device) located on the public network 110 to computing devices located within the private network 120. Similarly, outbound communications are network communications directed towards the public network 110 from computing devices located within the private network 120.

Alternatively, or in addition, the EMDS may provide the suspicious object identifier to the NMDS indirectly by modifying the suspicious object (e.g., a URL contained in the email) so as to append the identifier before the suspicious object is delivered to the intended recipient of the email. When the email is delivered to the intended recipient, the recipient may elect to activate the suspicious object, e.g., by clicking on the on-screen display of the URL. When the suspicious object associated with the identifier is activated by the intended recipient, the NMDS will detect outbound traffic containing the identifier and seek to discover ("hunt") any inbound traffic responsive to that detected outbound traffic, e.g., exchanged during the same communication session as the outbound traffic. If so detected, the NMDS will schedule any object contained in the detected inbound traffic for analysis. Accordingly, by communicating, directly or indirectly the EMDS coordinates its detection capabilities with the NMDS. After the email is received by the designated recipient (e.g., as identified by a destination address set out in the email's header) and the email opened by the recipient an object within the email may be activated by the recipient (e.g., by "clicking" on a URL, or otherwise seeking to download web content (e.g., webpages) using the recipient's browser. The recipient may activate the object in the email by viewing the email or browsing content contained in the email. If the activated object initiates a communication session over the enterprise network protected by an NMDS associating the object with a suspicious email as identified by the EMDS, the NMDS may assign a higher priority to the analysis of content received during the communication session. The higher priority for analysis in the NMDS may be reflected in a scheduler modifying an analysis queue, effectively reducing the priority of other objects for analysis. The higher priority is granted to suspicious objects first identified by the EMDS because the combined email and network attack represents a higher probability of maliciousness.

The NMDS may retrieve the features associated with the activated object from the EMDS to be used by the NMDS as additional context in the analysis of the network content received during the communication session. The NMDS may use static and/or dynamic analysis modules to analyze received network content for features. The features associated with suspicious email (identified by the EMDS) and the features identified by the NMDS analyzing the network content in response to the designated recipient activating the suspicious email are provided to a classification engine, which may incorporate a correlation and classification logic, to determine if the content is malicious. In some embodiments the correlation logic may be implemented in a separate correlation engine, the correlation engine receiving features from the analysis engines (e.g., a static analysis engine and/or a dynamic analysis engine, etc.) and generating a correlation with the features of labelled objects. The labelled objects are objects classified and confirmed as benign or malicious. The correlations may be used to generate a maliciousness score. The scores generated by the correlation engine are provided to the classification module for a decision as to classification of the object as benign or malicious. The classification module may combine scores associated with one or more features to determine if the object is malicious. The classification module bases its decision on a comparison of the scores or combined scores with a malicious threshold. In some embodiments the score associated with the object must exceed a fixed maliciousness threshold. In further embodiments the threshold for maliciousness may be dynamically based on context information developed by the NMDS and/or provided by the EMDS (e.g., a lower threshold may be used when a prevailing threat against the enterprise exists). If the classification module determines the object is malicious, the NMDS may issue an alert to an administrator and/or to a centralized management system for further distribution.

The enhanced malware detection system described herein coordinates the detection of malicious objects employed in a cyber-attack across attack vectors by combining analysis results from different attack phases. In this way, a cyber-attack involving a plurality of intrusions into an enterprise network can be detected and penetrations by malicious objects prevented or at least more quickly remediated and resulting damage mitigated.

Terminology

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

A network communication session is semi-permanent interactive information interchange between two or more communicating devices (e.g., an endpoint and network connected server communicating via network interfaces connected through network links). An established network communication session may involve more than one message in each direction. A network communication session is typically, stateful, meaning that at least one of the communicating parts needs to save information about the session history in order to be able to communicate, as opposed to stateless communication, where the communication includes independent requests with responses.

The term "processing" may include execution of a binary or launching an application wherein launching should be interpreted as placing the application in an open state and, in some implementations, performing simulations of actions typical of human interactions with the application. For example, an internet browsing application may be processed such that the application is opened and actions such as visiting a website, scrolling the website page, and activating a link from the website are performed (e.g., the performance of simulated human interactions).

The term "network device" should be construed as any electronic device with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, standalone appliance, a router or other intermediary communication device, firewall, IPS, etc. A network device may also include a network traffic sensor located within a network, communicatively coupled to a remote computing node, each operating on hardware, typically employing firmware and/or executable software to perform malware analysis.

The term "object" generally refers to a collection of data, whether in transit (e.g., over a network) or at rest (e.g., stored), often having a logical structure or organization that enables it to be categorized or typed for purposes of analysis. During analysis, for example, the object may exhibit a set of expected and/or unexpected characteristics and, during processing, a set of expected and/or unexpected behaviors, which may evidence the presence of malware and potentially allow the object to be categorized or typed as malware. In one embodiment, an object may include a binary file that may be executed within a virtual machine. Herein, the terms "binary file" and "binary" will be used interchangeably.

"Features" may include characteristics, where characteristics include information about the object ascertained based on an inspection of the object, which does not require execution or other processing of the object. Characteristics may include meta-information associated with the object, anomalous formatting or structuring of the object. Features may also include behaviors, where behaviors include information about the object and its activities during its execution or processing. Behaviors may include, but are not limited to, attempted outbound communications initiated by the object over a network connection or with other processes, patterns of activity or inactivity, and/or attempts to access system resources.

The term "malicious" may represent a probability (or level of confidence) that the object is associated with a malicious attack or exploit of a known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during processing in one or more VMs, (vi) attempts to access, without the appropriate permissions, memory allocated for the application during processing, (vii) patterns of activity or inactivity, (viii) generation of additional files or executable binaries, (ix) generation of forms to collect sensitive user data (e.g. passwords, credit card information, etc.), and/or (x) other factors that may evidence unwanted or malicious activity.

The term "identifier" (or "signature") designates a set of characteristics and/or behaviors exhibited by one or more malware, which may or may not be unique to the malware. Thus, a match of the signature may indicate to some level of probability that an object constitutes malware. In some contexts, those of skill in the art have used the term "signature" as a unique identifier or "fingerprint." For example, a specific malware or malware family, may be represented by an identifier which is generated, for instance, as a hash of its machine code (executable program code), and that is a special sub-case for purposes of this disclosure.

The term "processing" may include execution of a binary, "just in time" compiling and execution of a script, or launching an application to open a document or take other action with respect to an object, wherein launching should be interpreted as placing the application in an open state and, in some implementations, performing simulations of actions typical of human interactions with the application. For example, the application, an internet browsing application (browser), may be processed such that the application is opened and actions such as visiting a website, scrolling the website page, and activating a link from the website are performed (e.g., often involving human interactions).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Coordinated Malware Detection System

FIG. 1 is an exemplary block diagram of an exemplary architecture for a coordinated malware detection system 100 including an email malware detection system 140 and a network malware detection system 150. Each of the components of the coordinated malware detection system 100 may be implemented as one or more computer programs, modules, or sub-routines executable by one or more processors and stored in memory.

The coordinated malware detection system 100 includes at least an email malware detection system (EMDS) 140 and a network malware detection system (NMDS) 150 connected via network links 130. The EMDS and NMDS may be connected within a private (e.g., enterprise) network 120 or connected through a public network 110. In some embodiments, the EMDS 140 is located within the private network 120, connected to the NMDS 150 via the network links 130, while the private network is connected to the public network 110. The coordinated malware detection system 100 receives electronic messages via the public network 110 at the EMDS 140. The NMDS 150 may be located within the enterprise network, at a network ingress/egress point (the network periphery) and/or may be remotely located and connected to protect the enterprise network, however, for ease, the NMDS is described as located within the enterprise network.

The EMDS 140 receives electronic messages ("email") via a communication interface 305 connected through network links 130 to the public network 110. The EMDS contains at least a static analysis logic 141 comprising an identifier scanner 142 and a heuristics engine 144, as well as a feature extractor 146, and a reporting engine 148. Email may be received by the EMDS according to one or more protocols (e.g. POP3, SMTP, etc.) and analyzed as an object. The EMDS is configured to analyze the object directed to the email's designated recipient 190 of the private network 120 to determine if the object is malicious and/or may be associated with maliciousness. The EMDS may be configured to intercept objects directed to the designated recipients, and upon determination of non-maliciousness direct the object to the designated recipient as an email. Alternatively, the EMDS may analyze a copy of the object directed to a designated recipient on the private network and allow the original copy of the object (the email) to be directed to the designated recipient without a determination of maliciousness. The EMDS may utilize various modules to determine the maliciousness of the object, including the identifier scanner 142, the heuristics engine 144 of the static analysis logic 141 and the feature extractor 146.

The feature extractor 146 is configured to extract certain data from the object so as to classify the object as suspicious, malicious, or benign using heuristic rules applied to the object. The feature extractor may extract URLs from the body of emails to be analyzed by the EMDS, thereby creating additional objects for analysis by the identifier scanner 142 and heuristics engine 144. In some embodiments, the feature extractor 146 may extract characteristics (features) associated with each object, for example, characteristics related to header parameters, payload parameters, compliance with message formats established by defined protocols. Features of objects extracted by the feature extractor 146 may be analyzed by the static analysis logic to determine if they contain the hallmarks of maliciousness.

The static analysis logic 141 may comprise an identifier scanner 142 which receives features associated with each object and compares it with one or more unique identifiers (e.g., signatures) associated with a determination of suspiciousness. The determination of suspiciousness may include a classification of "benign" or not associated with maliciousness, "malicious" or identified to bear the hallmarks of maliciousness, and "suspicious" or bearing non-definitive hallmarks of maliciousness. In some embodiments, this labelling of features associated with maliciousness may be reflected in a maliciousness score. The maliciousness score may, for example, be expressed as a probability associated with maliciousness (e.g. score of 0 associated with benign features, and a score of 100 associated with malicious features). In some embodiments, the identifier scanner 142 may be configured with a whitelist (identifiers determined to be benign), a blacklist (identifiers determined to be malicious), and a graylist (identifiers that are sometimes (not definitively) indicative of maliciousness and thus associated suspicious). The comparison of labelled identifiers, by the identifier scanner 142, from a store of identifiers (not shown) may be compared with an identifier generated from a hash of its machine code or other characteristics or content of the object or email. The identifier scanner 142 may receive and store additional identifiers from the identifier generator 182 of the NMDS 150, updating the detection capabilities of the identifier scanner with identifiers the NMDS determined are malicious or benign. In some embodiments, if the object is deemed suspicious and/or cannot be determined to be either benign or malicious the EMDS may continue processing the object using the heuristics engine 144 of the static analysis logic 141.

The heuristics engine 144 associates characteristics of the objects, such as formatting or patterns of the content, and uses such characteristics to determine a probability of maliciousness. The heuristics engine 144 applies heuristics and/or probability analysis to determine if the objects might contain or constitute malware. Heuristics engine 144 is adapted for analysis of an object to determine whether it corresponds, for example, to any of the following: (i) a "suspicious" identifier, such as either a particular Uniform Resource Locator ("URL") that has previously been determined as being associated with known malware, a particular source (IP or MAC) address related to the object that has previously been determined as being associated with known malware; or (ii) a particular malware pattern. A match of an identifier may indicate, to some level of probability, often well less than 100%, that an object is malicious. The identifiers may represent identified characteristics (features) of the potential malware. The heuristics engine 144 may create an identifier associated with one or more characteristics of the object generating a hash of the characteristics. The heuristics engine 144 may include scoring logic to correlate one or more characteristics of potential malware with a score of maliciousness, the score indicating the level of suspiciousness and/or maliciousness of the object. In one embodiment, when the score is above a first threshold, the heuristics engine 144 may generate an alert that the object is malicious to be reported by the reporting engine 148.

The EMDS may coordinate with other malware detection systems via a coordination engine 147. The coordination engine 147 may receive and/or generate a suspicious object identifier and meta-information associated with the suspicious object (identified by the suspicious object identifier) from the static analysis logic 141 and/or the feature extractor 146, respectively. In some embodiments, the suspicious object identifier may comprise a static string to be embedded in the suspicious object and in other embodiments the suspicious object identifier may comprise a characteristic of the object itself. The coordination engine of the EMDS may provide the received information and suspicious object identifier to a coordinated monitoring logic 155 of the NMDS 150 via a set of communication interfaces 305 coupled via the network links 130 (represented in FIG. 1 as a dedicated link 135). The communication between the EMDS and NMDS may, in one embodiment, be conducted through a network or through a dedicated link used only for the purpose of coordination between the two systems, via respective communication interfaces 305. The coordination engine may also receive, from the coordinated monitoring logic 155, a determination of maliciousness resulting from further analysis by the NMDS 150. Other additional information, such as features extracted by the feature extractor 146, may optionally be provided to the classification engine 180 of the NMDS 150 via the coordination engine 147 of the EMDS to be combined with features extracted by the static analysis logic 160 and/or dynamic analysis logic 170 of the NMDS to classify the object as malicious or benign. For example, the coordination engine 147 may communicate with a NMDS 150, the likelihood of maliciousness (e.g. a maliciousness score) of the processed object, the maliciousness score combined with the results of the NMDS dynamic analysis and the classification engine 180 determining maliciousness of the object.

The reporting engine 148 is adapted to receive information from the identifier scanner 142, static analysis logic 141 and optionally the feature extractor 146, and subsequently generate alerts related to malware that are sent to a network administrator, and/or expert network analyst when a malicious and/or suspicious object is detected during analysis of a received email by the EMDS, etc.

The EMDS 140 may alter delivery of an analyzed email to the indicated recipient (e.g., indicated in the "To:" field of the email header) in response to the analysis results. If the EMDS 140 determines an email is malicious through analysis of the email itself and/or one or more objects contained within the email, the EMDS may quarantine or otherwise prevent delivery of the email to the intended recipient and/or generate and issue an alert by the reporting engine 148 to a network administrator. In some embodiments, if the EMDS 140 determines an email is suspicious through analysis of the email itself or one or more objects contained within the email, the EMDS may modify one or more suspicious objects contained within the email before the email is delivered to the intended recipient. For example, a URL contained within an email is analyzed by the EMDS as an object and determined to be suspicious, it may be modified to contain a "suspicious object" identifier (i.e., the URL may be modified to indicate to a recipient (and others) and an NMDS that the URL is suspicious) before the email is delivered to an email's designated recipient at an endpoint 190. Some embodiments may also add a displayable (human readable) warning to the recipient of the suspiciousness of the embedded URL.

The NMDS 150 may, in some embodiments, be located within and operable to protect an enterprise private network 120 by monitoring the network traffic carried by the enterprise network 120. In some embodiments the NMDS may act as an intermediary device between a public network 110 and one or more endpoints 190 while in alternative embodiments the NMDS may act as a network "tap" and obtain a copy of network traffic as it transits across the enterprise network. In other embodiments the NMDS may be remotely located and operable to analyze network traffic and/or objects contained within the network traffic provided by network monitor), (e.g., as embodied in a firewall, IPS, network sensor, or network traffic device etc.) located within the enterprise network. As used herein, the NMDS may be embodied as an appliance embodied as any type of general-purpose or special-purpose computer, including a dedicated computing device, adapted to implement a variety of software architectures relating to exploit and malware detection and related functionality. The term "appliance" should therefore be taken broadly to include such arrangements, in addition to any systems or subsystems configured to support such functionality, whether implemented in one or more network computing devices or other electronic devices, equipment, systems or subsystems. Alternatively, one or more aspects of the NMDS may be embodied in as a virtualized application instance executed by a processor of a network device operable within the private network 120 or accessible via an on-premises cloud.

The NMDS 150 includes a coordinated monitoring logic 155, a static analysis logic 160 comprising at least an identifier engine 164, and a heuristics engine 166, a dynamic analysis logic 170 comprising at least a scheduler 172, one or more virtual machine(s) 174, a feature logic 176, as well as a classifying engine 180 and a reporting engine 184. The malware analysis may involve static, dynamic and/or an optional emulation analysis, as generally described in U.S. Pat. No. 9,223,972, the entire contents of which are incorporated herein by reference.

The NMDS 150 interoperates with the EMDS 140, the interoperation resulting from the cooperation of the EMDS coordination engine 147 and the NMDS coordinated monitoring logic 155. The coordinated monitoring logic 155 identifies network communication sessions associated with a suspicious object identifier, the suspicious object identifier generated by coordination engine 147 and provided to the coordinated monitoring logic. If the coordinated monitoring logic 155 detects a suspicious object, the object and associated content is scheduled by the scheduler 172 for analysis by the dynamic analysis logic 170. In some embodiments, the suspicious object may be extracted from the monitored network traffic, while in other embodiments the suspicious object may be stored in the EMDS and later retrieved from a suspicious object store for analysis in the NMDS when the NMDS detects network communication sessions associated with the suspicious object identifier. In some embodiments, the NMDS monitors the network traffic between the private network 120 and another network, e.g., the public network 110, via the communication interface 305 of the NMDS for traffic associated with the suspicious object identifier. The coordinated monitoring logic 155 coordinates suspicious object identifiers and their respective features between the EMDS 140 and the NMDS 150. The coordinated monitoring logic 155 may store suspicious object identifiers received from the EMDS 140 via the coordination engine 147 in a coordination store 316. The coordinated monitoring logic may update the coordination store 316 based on additional analysis conducted by the static analysis logic 160 and/or the dynamic analysis logic 170 of the NMDS 150. The coordinated monitoring logic operates by analyzing received objects within network traffic by the communication interface 305 and if associated with a received suspicious object identifier submits each object to the scheduler 172 for further analysis by the dynamic analysis logic 170. In some embodiments, the coordinated monitoring logic 155 determines network traffic is associated with a suspicious object identified by the EMDS 140 by examining network requests originating within the private network to determine if it contains a modified URL pattern (i.e. an HTTP request originating within the private network 120, directed to the public network 110 monitored by the coordinated monitoring logic of the NMDS). In some other embodiments, the coordinate monitoring logic may receive an object containing a static suspicious object identifier (e.g. string in a URL, etc.) indicating to the NMDS that the object is suspicious, further requiring the NMDS to modify the object to its original form (such that object will function as the author intended). For example, if the URL had been modified by the EMDS 140, the coordinated monitoring logic 155 receives the modified URL pattern and reverses the modification of the URL, and reissues the network request with the original URL. In still further embodiments the coordinated monitoring logic 155 receives an identifier associated with the suspicious object via the EMDS coordination engine 147 issuing a signal to the coordinated monitoring logic and stored in the coordination store 316. The coordinated monitoring logic 155 analyzes monitored network traffic to determine if the traffic is associated with an identifier stored in the coordination store 316. The network traffic related to this network request is monitored and objects extracted for further analysis by the NMDS 150 using the static analysis logic 160 and the dynamic analysis logic 170. If the coordinated monitoring logic 155 detects network traffic associated with a suspicious object identifier, the coordinated monitoring logic 155 communicates to the scheduler 172 to schedule the detected network traffic for analysis. In some embodiments the scheduler prioritizes the analysis of the NMDS detected suspicious objects.

The static analysis logic 160 of the NMDS 150 may receive network traffic from which objects, as well as related meta-information, may be extracted and analyzed for maliciousness. In some embodiments suspicious objects may be received by the static analysis logic 160 for analysis from the coordinated monitoring logic 155. In other embodiments the static analysis logic 160 may receive monitored network traffic, via the communication interface 305, from which objects must be extracted for analysis. The static analysis logic 160 may provide the objects to the identifier engine 164 to identify if the objects match known identifiers of malware. The identifier engine 164 may incorporate, in memory (not separately shown), a database of known malware identifiers. The database of known malware identifiers may be updated by receiving through the public network 110 or the private network 120, via network interconnects 130, new identifiers of malware.

The heuristics engine 166 analyzes characteristics of objects in the monitored network traffic, such as formatting or patterns of their content, and uses such characteristics to determine a probability of maliciousness. The heuristics engine 166 applies heuristics and/or probability analysis to determine if the objects might contain or constitute malware. The heuristics engine 166 is adapted for analysis of objects to determine whether it corresponds to malware to a level of confidence, based on one or more of the following: (i) a "suspicious" identifier such as either a particular Uniform Resource Locator "URL" that has previously been determined as being associated with known malware, or a particular source or destination (IP or MAC) address that has previously been determined as being associated with known malware; (ii a particular pattern contained in the object that is associated with malware, or (iii) non-compliance with at least one rule, which non-compliance is associated with malware based on experiential knowledge and machine learning with respect to previously analyzed malware and benign samples. To illustrate, the heuristics engine 166 may be adapted to perform comparisons of an object under analysis against one or more pre-stored (e.g., pre-configured and/or predetermined) attack patterns stored in memory (not shown). The heuristics engine 166 may also be adapted to identify deviations in messaging practices set forth in applicable communication protocols (e.g., HTTP, TCP, etc.) exhibited by the traffic packets containing the object, since these deviations are often characteristic of malware. A match of an identifier may indicate, to some level of probability, often well less than 100%, that an object constitutes malware. The identifiers may represent identified characteristics (features) of the potential malware. The heuristics engine 166 may include scoring logic to correlate one or more characteristics of potential malware with a score of maliciousness, the score indicating the level of suspiciousness and/or maliciousness of the object. In one embodiment, when the score is above a first threshold, the heuristics engine 166 may generate an alert that the object is malicious. When the score is greater than a second threshold but lower than the first threshold, the object may be provided to the static analysis logic and/or the dynamic analysis logic for further analysis. When the score is less than the second threshold, the threat detection system may determine no further analysis is needed (e.g., the object is benign).

If the coordinated monitoring logic 155 detects a suspicious object by associating the monitored network communications with the suspicious object identifier, the suspicious object is provided to the dynamic analysis logic 170, via the scheduler 172, for further analysis. The suspicious object detected by the coordinated monitoring logic is associated with an object determined by the EMDS to be suspicious. In some embodiments the scheduler 172 is responsible for provisioning and instantiating a virtual machine to execute the suspicious object at a scheduled time and/or order. In some embodiments, the coordinated monitoring logic 155 may provide the scheduler 172 with further information which may be used to associate an analysis priority with the suspicious object scheduled for analysis by the dynamic analysis logic 170. The coordinated monitoring logic 155 may associate a higher priority to suspicious objects associated with objects deemed suspicious by the EMDS 140 and otherwise a lower priority. In some embodiments, the heuristics module 166 transmits the meta-information identifying a destination device to the scheduler 172, which may be used to provision a virtual machine with appropriate software.

Processing of a suspicious object may occur within one or more virtual machine(s), which may be provisioned by the scheduler 172 with one or more software profiles. The software profile may be configured in response to configuration information provided by the scheduler 172, information extracted from the meta-information associated with the object, and/or a default analysis software profile. Each software profile may include an operating system (OS), one or more applications, and possibly other components appropriate for execution of the object. In some cases, the software profile includes those software components necessary for processing the object, as installed at or of the same type or brand as those installed at the destination endpoint. A virtual machine is executable software that is configured to mimic the performance of a device (e.g., the destination device). Each of the one or more virtual machine(s) 174 may further include one or more monitors (not separately shown), namely software components that are configured to observe, capture and report information regarding run-time behavior of an object under analysis during processing within the virtual machine. In other embodiments, the monitors may be located outside the virtual machines and operable to capture and report information regarding the virtual machine run-time behavior. The observed and captured run-time behavior information as well as effects on the virtual machine, otherwise known as features, along with related meta-information may be provided to a feature logic 176.

The feature logic 176 may correlate one or more characteristics and monitored behaviors (features) with a weight of maliciousness. The weight of maliciousness reflects experiential knowledge and machine learning of the respective features (characteristics or monitored behaviors) with those of known malware and benign objects. To illustrate, during processing, the dynamic analysis logic 170 may monitor for several behaviors of an object processed in the one or more virtual machine(s) 174, where, during processing, the object may, for example, execute a program that identifies personally identifiable data (e.g. login information), generate and encrypt the data in a new file, and send the encrypted data via a network connection to a remote server (exfiltrates the data). Each individual event may generate an independent score, weighted by the feature logic 176, the weight based on experiential knowledge as to the maliciousness of each associated event. The individual scores or a combined score may be provided to the classifying engine 180. Alternatively, in some embodiments, the generation of a combined score may be performed by the classifying engine 180, or the feature logic 176 and classifying engine 180 may be combined into a single engine.

The classifying engine 180 may be configured to classify a suspicious object based on the features detected by the static analysis logic 141 of the EMDS 140 and the behaviors (expected and unexpected/anomalous) monitored by the dynamic analysis logic 170 of the NMDS and/or characteristics identified by the static analysis logic 160 of the NMDS. In some embodiments, the classifying engine 180 may use only the correlation information provided by the feature logic 176. That is, a determination of maliciousness of the object may be rendered by correlating the monitored behaviors against behaviors of known malware without regard to results of the static analysis logic 160 or the analysis results of the EMDS 140. The classification engine may also receive meta-information originated by the EMDS 140 and associated with the suspicious object or its associated email to be combined with the behavioral information monitored by the dynamic analysis logic 170 to generate the classification by the classification engine 180. Analysis results from the static analysis conducted by the static analysis logic 160 may also be used in the correlation and classification, e.g., by being combined with the results of the dynamic analysis and analysis of the email by the EMDS 140 to yield a combined score. A classification of "maliciousness" may be reported to a network and/or security analyst by the reporting engine 184 issuing an alert.

In an embodiment, the classifying engine 180 may be configured to use the scoring information provided by feature logic 176 (and, in some embodiments, provided by the EMDS with respect to the associated email) to classify the suspicious object as malicious, suspicious, or benign. In one embodiment, when the score is above a first threshold, the reporting engine may generate and issue an alert that the object is malicious. When the score is greater than a second threshold but lower than the first threshold, the object remains suspicious and the object may be provided to a network security analyst or an advanced malware analysis engine for further analysis. When the score is less than the second threshold, the classifying engine 180 may determine no further analysis is needed (e.g., the object is benign). The threshold of maliciousness may be fixed, modified by as security administrator, and/or modified based on network conditions (for example, if a network is experiencing anomalous network conditions, if other clients of a similar type are under confirmed attack, etc.). Having classified the suspicious object, as analyzed by the NMDS in response to submission for scheduling by the coordinate monitoring logic, as "benign" or "malicious", the classifying engine 180 may provide the object to an identifier generator 182 to generate identifiers associated with the classified object for use by the coordinated monitoring logic 155 and identifier engine 164 of the NMDS 150 and the identifier scanner 142 of the EMDS 140. The identifier scanner 142 may receive newly generated identifiers associated with malicious objects (malware) from the NMDS 150 via the communicatively coupled communication interfaces 305 in the NMDS 150 and EMDS 140. In some embodiments, the identifiers generated by the identifier generator 182 may be "fingerprint" type signatures, formed as a hash of the object. Alternatively, or in addition, the identifiers may include observed features, including characteristics and behaviors. The identifiers thus generated may be provided to the identifier scanner 142 of the email malware detection system 140 via signaling over the network links 130 and the communication interface 305. The identifier generator 182 may alternatively bypass the generation of an identifier if the classifying engine determines that the analyzed object is not malicious.

If the NMDS 150 classifies the object as malicious based on a static analysis results and/or dynamic analysis results, the reporting engine 184 may signal to a network or security administrator for action by an appropriate alert.

Figure 2:
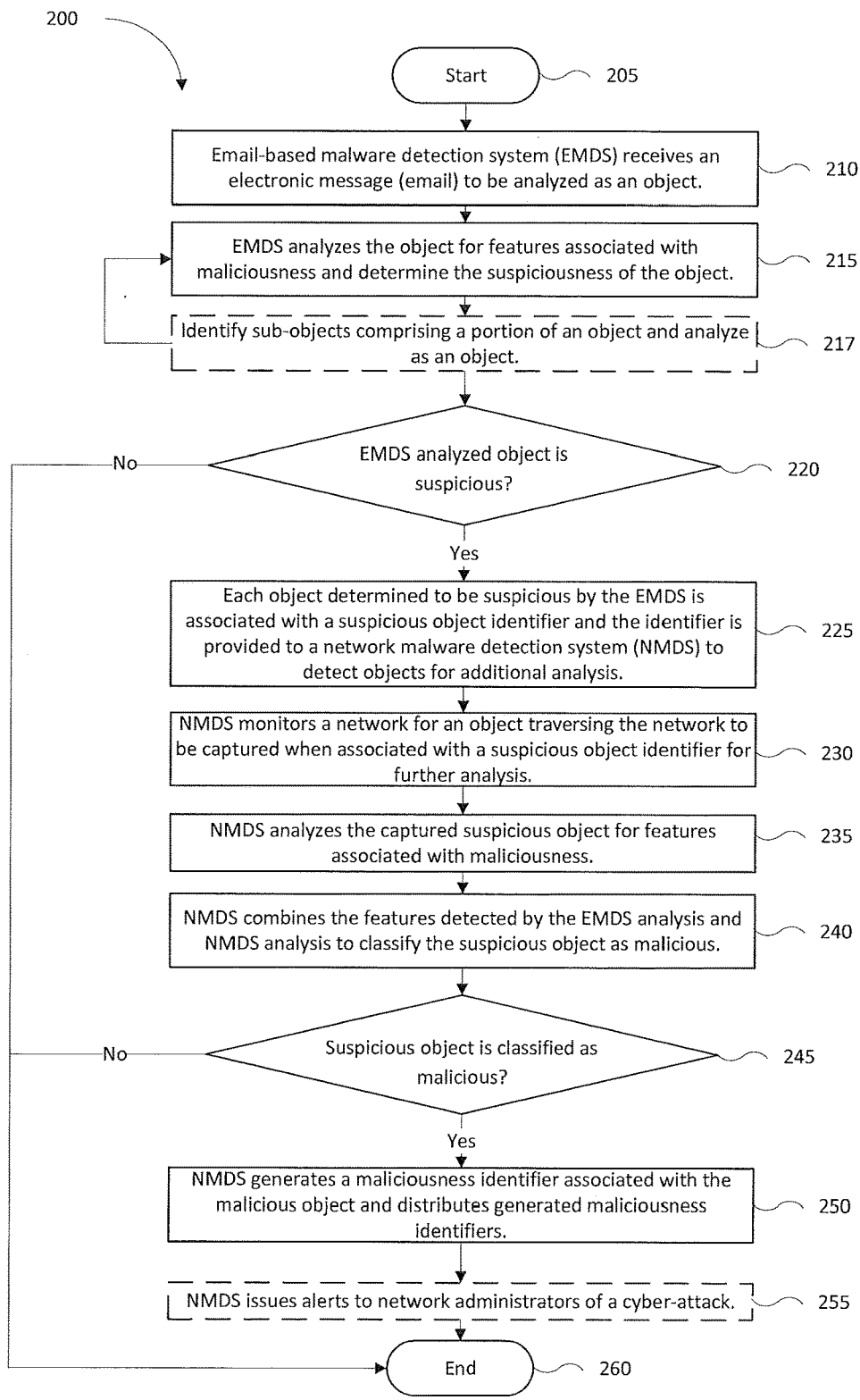
FIG. 2 is a flowchart of an exemplary method for detecting a cyber-attack involving an email and separate network traffic in accordance with one or more embodiments described herein.

FIG. 2 is an example computerized method 200 for operating the coordinated malware detection system. The term "computerized" generally represents that operations are conducted by hardware in combination with executable software and/or firmware. The procedure 200 starts at step 205 and proceeds to step 210 where an email malware detection system 140 receives network traffic directed to an email's designated recipient on an endpoint 190 within the private network 120. In some embodiments, the email malware detection system (EMDS) 140 may be located outside the private network 120 however, accessible to the endpoint 190 via the public network 110. The endpoint 190 may comprise an application for viewing and/or accessing an email using resources associated with the private network 120 (e.g., an email application running on a desktop or laptop computer connected to the private network, a browser-based email application used for accessing email while connected to the private network 120 through the public network 110, etc.).

At step 215 the EMDS 140 analyzes the received email, as an object, using an identifier scanner 142 to determine if the object (including, but not limited to, URLs) has previously been classified as malicious or benign, as well as processing by a feature extractor 146 and heuristics engine 144 to determine if features (characteristics of maliciousness extracted from the object corresponding to the email) of the objects (including the email) bear the hallmarks of suspiciousness. In some embodiments, an optional step 217 may be implemented, wherein objects analyzed in step 215 are further examined to determine if there are sub-objects. If a sub-object, as described above, is identified by step 217, the procedure returns to step 215 for feature extraction by the feature extractor 146 of EMDS 140. The sub-objects are extracted from objects recursively.

If an object is matched with a corresponding identifier by the identifier scanner 142 (previously described), the object may be determined to not be suspicious in step 220 (if the object's corresponding identifier has been classified as malicious or benign). If the identifier scanner 142 does not identify the object as benign or malicious, the processing of the object may continue by the feature extractor 146 cooperating with the heuristics engine 144. In some embodiments the feature extractor 146 may analyze an object and extract meta-information and/or content of the object that may be relevant to determining if the content is suspicious and/or malicious (i.e. characteristics or features). The features extracted from an object are processed by the heuristics engine 144 (as described above) to determine if the object is benign, suspicious, or malicious. In some embodiments, if the object cannot be classified as benign or malicious, the object will be determined to be suspicious. If an object is found to be suspicious by step 220, analysis will continue through step 225, otherwise processing will end at step 260.

In step 225, the EMDS 140, having determined the object to be suspicious, causes the coordination engine 147 to send a suspicious object identifier to the NMDS 150. The suspicious object identifier may be generated by the coordination engine 147 and provided via the communication link 135 to the coordinated monitoring logic 155 of the NMDS.

In some embodiments, the coordination engine 147 modifies the suspicious object (e.g., the URL of the email) to append the suspicious object identifier. The communication interface 305 of the EMDS 140 delivers the email with the modified suspicious object to the designated recipient. If the recipient activates the modified suspicious object (e.g., by clicking" on the on-screen display of the URL), the suspicious object associated with the identifier is activated, and the NMDS will detect the ensuing outbound traffic containing the identifier (e.g., requesting download of a webpage associated with the URL). The coordinated monitoring logic 155 of NMDS will seek to discover ("hunt") any inbound traffic (e.g., the webpage) responsive to that detected outbound traffic, e.g., exchanged during the same communication session as the outbound traffic. If so detected, the NMDS will schedule any object contained in the detected inbound traffic (e.g., a JavaScript) for analysis.

For example, an EMDS may identify a URL in an email as suspicious, and accordingly, before the email is provided to the intended recipient, the EMDS may flag the suspicious object (i.e., suspicious URL) by appending a suspicious object identifier, for example, "SOI-20160101" (so as to generate a modified suspicious URL of http://suspiciousdomain.com/index.html?t=SOI-20160101). When the modified suspicious object is activated by the designated recipient 190, initiating a network communication session, the NMDS's coordinated monitoring logic 155 identifies that network communication session which is associated with (e.g., contains) the suspicious object identifier "SOI-20160101" and provides any object extracted from the inbound traffic of the communication session to the scheduler 172 for the initiation of dynamic analysis. In some embodiments, if the coordinated monitoring logic 155 identifies network communications associated with the suspicious object identifier, the coordinated monitoring logic 155 may retrieve the original suspicious object (as detected by the EMDS) from a remote object store (not shown) for use in behavioral analysis of the extracted object since some advanced malware may only exhibit malicious behavior in the presence of the original object.

In another embodiment, the EMDS's coordination engine 147 may directly provide the NMDS's coordinated monitoring logic 155 with a suspicious object identifier. The NMDS may use the identifier to discover (hunt) any inbound traffic or outbound traffic associated with (e.g., containing) the identifier. In such an embodiment, the NMDS monitors network traffic exchanged between the private network 120 and the public network 110 for any communications associated with (e.g., containing) the identifier, and captures those communications for further analysis by the NMDS. For this, the NMDS's coordinated monitoring logic 155 provides those captured communications as a flow (i.e., group of related packets) or at least one or more objects extracted from the captured communications to dynamic analysis logic 170 for scheduling by the scheduler 172 of behavioral analysis.

For example, if an email containing a suspicious object (e.g., such as a macro where a macro is an instruction that expands into a set of instructions to perform a particular task and are most commonly written in a scripting language, with direct access to the features of the underlying application or system) is identified by the EMDS, the coordination engine 147 may communicate a suspicious object identifier associated with the macro contained in the email to the coordinated monitoring logic 155 of the NMDS. When a recipient of the email activates the suspicious object (e.g., by opening the macro), the activation may initiate a communication session with an external entity (e.g., a web server located in the public network responsive to communications from the suspicious network object). The coordinated monitoring logic 155 monitors that communication session to hunt for and capture an object in any inbound communication included in that session. For example, the NMDS may detect the network connection associated with the suspicious object (e.g., URL or macro) by examining meta-information associated with the communication (e.g. HTTP 301 "Moved Permanently"), and extract any object contained in inbound communication in that session. The coordinated monitoring logic provides the scheduler with the communication meta-information and object (both associated with the suspicious object identifier) for further analysis by the dynamic analysis logic 170.

In step 230, when the coordinated monitoring logic 155 identifies a network communication associated with the suspicious object identifier generated by the EMDS 140, it is scheduled for further analysis by the NMDS. The NMDS 150 may prioritize analysis, in the dynamic analysis logic 170, of objects associated with the suspicious object identifier by instructing the scheduler 172 to prioritize analysis of objects provided by the coordinated monitoring logic 155. For example, having received a suspicious object from the coordinated monitoring logic 155, the scheduler 172 may schedule objects associated with a suspicious object identifier generated by the EMDS before other objects. The analysis of the network traffic associated with the suspicious object, in step 235, is conducted by the dynamic analysis logic 170, and in some embodiments, the static analysis logic 160. The analysis of an object described in step 235 is conducted by the analysis logic and includes the detection of features (including characteristics identified by the static analysis logic 160 and behaviors monitored by dynamic analysis logic 170) associated with the object. The features detected by the analysis logic is combined in step 240.

In step 240, the features detected in step 245 by the analysis logic are received by the classifying engine 180. The classifying engine 180 may combine the features to generate a score associated with maliciousness (as described above). The score would be used to determine if the object analyzed is malicious in step 245. In some embodiments the features detected by the EMDS 140 and the NMDS 150 may be combined to determine if the object is malicious. In further embodiments, the score for each feature may be considered separately to determine if the object is malicious. In still further embodiments, the scores for related features may be combined to determine if the score of the combined features exceed a maliciousness threshold and determinative of maliciousness. If the classifying engine 180 determines the object is not malicious the method proceeds to step 260, where analysis ends. In some embodiments, if the classifying engine 180 determines that an object is not malicious, the meta-information associated with this determination (e.g., one or more scores, etc.) as well as the classification may be provided to the reporting engine 184 and alert issued to a network security administrator. Similarly, in step 255, if the classifying engine determines that the object is benign, the reporting engine 184 may issue an alert to the EMDS 140 and the identifier engine 164 of the NMDS 150 containing an identifier for the benign object to be stored in a "whitelist" (i.e. a predefined list of benign objects) for future object analyses. If, in step 245, the classifying engine 180 determines that the object is malicious, the method proceeds to step 245.

During step 250 the reporting engine 184 may issue an alert to the EMDS 140 and the identifier engine 164, of the NMDS 150, containing an identifier for the malicious object to be stored in a "blacklist" (i.e. a predefined list of malicious objects) for future object analyses. The NMDS 150 may also generate a separate identifier associated with the network traffic generated by the suspicious object, based on the features detected in step 235, to generate a network identifier associated with the malicious object. The network identifier may be provided by the reporting engine 184 to the identifier engine 164 to identify similarly malicious network traffic by the NMDS 150 in step 255.

The coordinated malware detection system 100, having initial identified a suspicious object received via an email by the EMDS 140, communicating an identifier to the NMDS 150 for network traffic monitoring, the NMDS analyzing network traffic associated with the suspicious object, and determining the maliciousness of that object and communicating the determination to the EMDS and NMDS identifier engine 164 for future blocking as well as to a security analyst. Once the maliciousness determination is reported by the reporting engine 184, the procedure ends at step 260.

FIG. 3A is an exemplary embodiment of a logical representation of the EMDS 140 of FIG. 1. The email malware detection system 140, in an embodiment may include a housing, which is made entirely or partially of a hardened material (e.g., hardened plastic, metal, glass, composite or any combination thereof) that protect circuitry within the housing, namely one or more processors 310 that are coupled to a communication interface 305 via a first transmission medium 307. The communication interface 305, in combination with a communication logic 320, enables communications with external network devices and/or other network appliances to receive updates for the email malware detection system 140. In some embodiments, a dedicated link 135 (shown in FIG. 1) communicatively couples the EMDS coordination engine 147 and the NMDS coordinated monitoring engine 155 to enable the interoperation of their respective detection capabilities. In other embodiments, the communicative link between the EMDS coordination engine and the NMDS coordinated monitoring engine is given effect via the private network via the communication interface 305. According to one embodiment of the disclosure, the communication interface 305 may be implemented as a physical interface including one or more ports for wired connectors. Additionally, or in the alternative, the communication interface 305 may be implemented with one or more radio units for supporting wireless communications with other electronic devices. The communication interface logic 320 may include logic for performing operations of receiving and transmitting one or more objects via the communication interface 305 to enable communication between the email malware detection system 140 and network devices via the a network (e.g., the internet) and/or cloud computing services.

The processor(s) 310 is further coupled to a persistent storage 315 via a second transmission medium 313. According to one embodiment of the disclosure, the persistent storage 315 may include, an identifier scanner 142, a heuristics engine 144, a feature extractor 146, and the communication interface logic 320. Of course, when implemented as hardware, one or more of these logic units could be implemented separately from each other or combined as appropriate.

FIG. 3B is an exemplary embodiment of a logical representation of the NMDS 150 of FIG. 1, (where like numbers used in FIG. 3A and FIG. 3B indicate like components). The NMDS 150, may also be embodied in a housing, as described above, to protect circuitry within the housing, namely one or more processors 310 that are coupled to a communication interface 305 via a first transmission medium 307. A communication interface 305 is coupled with one or more hardware processor(s) 310 and a persistent storage 315 via a first transmission medium 307 and a second transmission medium 313, respectively.

According to one embodiment of the disclosure, the persistent storage 315 may include, a coordinated monitoring logic 155, a static analysis logic 160, a dynamic analysis logic 170, a reporting engine 184, and the communication interface logic 320. The static analysis logic 160 may further include, in some embodiments an identifier engine 164, and/or a heuristics engine 166. Similarly, the dynamic analysis logic 170, in some embodiments, may further include a scheduler 172, one or more virtual machine(s) 174, and a feature logic 176. Of course, when implemented as hardware, one or more of these logic units could be implemented separately from each other or combined as appropriate.

In some embodiments, the static analysis logic of the EMDS may be, at least in part, implemented in an endpoint 190, such as personal computer, laptop or other network device. The endpoint static analysis logic may monitor electronic messages received via a dedicated application (e.g. an email client) or a browser based email client (e.g. monitoring may be achieved via a browser-plugin) and analyzed using an identifier scanner and/or heuristics engine to determine if objects contained within the received emails are suspicious. In an endpoint implementation, a coordination engine would be implemented to coordinate suspicious object identifiers with an NMDS.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computer-implemented method for detecting a cross-vector cyber-attack initiated via an email, the method comprising:
receiving, by a network malware detection system (NMDS) from an email malware detection system (EMDS), (i) a suspicious object identifier associated with an object extracted from a suspicious email and (ii) one or more features of the object detected by the EMDS, the NMDS having at least one hardware processor;
monitoring network traffic, by the NMDS, for communications associated with the suspicious object identifier, and extracting a suspicious network object from the communications;
analyzing the suspicious network object by the NMDS to detect features of the suspicious network object;
correlating, by the NMDS, the detected features of the suspicious network object with the one or more features detected by the EMDS in order to determine a classification of the object extracted from the suspicious email; and
issuing, by a reporting engine, an alert to an administrator when the object extracted from the suspicious email is classified as malicious.

2. The method of claim 1, wherein the correlating step combines features detected by a static analysis logic of the NMDS.

3. The method of claim 1, wherein the suspicious object identifier is received by the NMDS from the EMDS via a network link.

4. The method of claim 1, wherein the suspicious object identifier is incorporated into the object by the EMDS and the object is activated, wherein activating the object generates network traffic.

5. The method of claim 1, wherein the correlating results in a determination of a maliciousness score for the object extracted from the suspicious email.

6. The method of claim 5, wherein the maliciousness score is used in classifying the object extracted from the suspicious email as benign or malicious.

7. The method of claim 1, wherein the correlating results in a determination of a maliciousness score for each of a plurality of features of the object extracted from the suspicious email.

8. The method of claim 7, wherein the maliciousness score of two or more features of the plurality of features are combined to determine an overall maliciousness score for the object extracted from the suspicious email.

9. The method of claim 1, wherein meta-information originated by the EMDS is utilized in a classification of the object extracted from the suspicious email.

10. A non-transitory computer-readable medium deployed within a network malware detection system (NMDS) including contents that, when executed by a processor, are configured to cause a detection of a multi-vector cyber-attack by performing operations comprising:
  receive a suspicious object identifier and first features of a suspicious object, from an email malware detection system (EMDS) and monitor network communications to detect and extract one or more objects associated with the suspicious object identifier, wherein the EMDS analyzed a received email to detect the suspicious object and the first features of the suspicious object and associated the suspicious object identifier with the suspicious object;
  analyze the one or more extracted objects associated with the suspicious object identifier in a virtual machine within a dynamic analysis logic of the NMDS to detect second features of the one or more extracted objects associated with the suspicious object identifier that are associated with malware; and
  correlate the first features with the second features in order to determine a classification of the suspicious object by a classification engine of the NMDS.

11. The non-transitory computer-readable medium of claim 10 wherein, the EMDS provides the suspicious object identifier to the NMDS through respective communication interfaces to monitor network communications.

12. A system for detecting a cross-vector cyber-attack received via an email, the system comprising:
  an email malware detection system (EMDS), with one or more first hardware processors and logic adapted to analyze the email and detect a suspicious object and first features of the suspicious object, and in response, generate a suspicious object identifier; and
  a network malware detection system (NMDS), the NMDS including logic adapted to receive the suspicious object identifier and the first features, monitor traffic on a private network for traffic associated with the suspicious object identifier and extract and analyze a network object in the traffic by the NMDS analysis logic for second features of the network object that are associated with malware;
  wherein the NMDS comprises a classification engine to receive and correlate the first features and the second features in order to determine a classification of the suspicious object.

13. The system of claim 12, wherein the EMDS further comprises a coordination engine to generate a suspicious object identifier for each suspicious object of the email.

14. The system of claim 12, wherein the suspicious object identifier is added to the first object and activation of the first object initiates network traffic.

15. The system of claim 12, wherein the NMDS generates a malicious object identifier in response to classifying the object as malicious and provides the malicious object identifier to the EMDS.

16. A computer-implemented method for detecting a cross-vector cyber-attack initiated via an email, the method comprising:
  monitoring network traffic, by a network malware detection system (NMDS), for communications associated with the suspicious object identifier, and extracting a suspicious network object from the communications, wherein the suspicious object identifier corresponds to a suspicious object detected in the email received by an email malware detection system (EMDS) and is received by the NMDS with first features of the suspicious from the EMDS, wherein the EMDS includes at least a second hardware processor and analyzes the email to detect the first features;
  analyzing the suspicious network object by a dynamic analysis logic of the NMDS, the dynamic analysis logic configured to detect second features based on processing of suspicious network object in a virtual machine, the second features being of the suspicious network object;
  correlating the second features with the first features in order to determine, by a classification engine, a classification of the first object; and
  issuing, by reporting engine, an alert to an administrator when the first object is classified as malicious.

17. The method of claim 16, wherein the classification engine receives and combines third features detected by a static analysis logic of the NMDS with the second features to correlate with known features of malware in order to determine a classification of the first object.

18. The method of claim 16, wherein associating each object with a suspicious object identifier comprises,
  modifying the first object with the suspicious object identifier; and
  delivering the email to the intended recipient with the modified first object.

19. The method of claim 16, wherein the monitoring of the network traffic associated with the suspicious object identifier further comprises,
  detecting outbound network communications associated with the suspicious object identifier;
  indicating to a scheduler the first object has been activated and scheduling dynamic analysis of the first object within the virtual machine; and
  removing the suspicious object identifier from the outbound network request and relaying the outbound network request to a designated destination.

20. The method of claim 16, wherein the EMDS uses a heuristic or blacklist to determine whether the object is malicious.

21. The method of claim 16, wherein the EMDS is communicatively coupled, via a public network, to the private network.

* * * * *